United States Patent
Ishizaki et al.

(10) Patent No.: US 7,085,827 B2
(45) Date of Patent: Aug. 1, 2006

(54) INTEGRATED SERVICE MANAGEMENT SYSTEM FOR REMOTE CUSTOMER SUPPORT

(75) Inventors: Takeshi Ishizaki, Sunnyvale, CA (US); Shigeru Miyake, Sunnyvale, CA (US); Hideyuki Yamamoto, Kudamatsu (JP); Koichiro Otani, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 710 days.

(21) Appl. No.: 09/956,635

(22) Filed: Sep. 20, 2001

(65) Prior Publication Data

US 2003/0055933 A1 Mar. 20, 2003

(51) Int. Cl.
G06F 15/173 (2006.01)
G06F 7/00 (2006.01)
G06F 15/16 (2006.01)
G06F 17/30 (2006.01)

(52) U.S. Cl. .................. 709/223; 709/219; 707/10
(58) Field of Classification Search ............... 709/223, 709/215; 707/1–10; 370/378
See application file for complete search history.

(56) References Cited

U.S. PATENT DOCUMENTS

| | | | |
|---|---|---|---|
| 5,768,271 A | 6/1998 | Seid et al. | |
| 6,073,172 A | 6/2000 | Frailong et al. | |
| 6,079,020 A | 6/2000 | Liu et al. | |
| 6,112,085 A | 8/2000 | Garner et al. | |
| 6,148,337 A | 11/2000 | Estberg et al. | |
| 6,173,399 B1 | 1/2001 | Gilbrech | |
| 6,175,917 B1 | 1/2001 | Arrow et al. | |
| 6,178,505 B1 | 1/2001 | Schneider et al. | |
| 6,192,454 B1 * | 2/2001 | De Vos | 711/154 |
| 6,205,488 B1 | 3/2001 | Casey et al. | |
| 6,421,711 B1 * | 7/2002 | Blumenau et al. | 709/213 |
| 6,567,848 B1 | 5/2003 | Kusuda et al. | |
| 6,597,956 B1 * | 7/2003 | Aziz et al. | 700/3 |
| 6,609,153 B1 * | 8/2003 | Salkewicz | 709/223 |
| 6,765,591 B1 * | 7/2004 | Poisson et al. | 715/735 |
| 2001/0050914 A1 | 12/2001 | Akahane et al. | |
| 2002/0019864 A1 | 2/2002 | Mayer | |
| 2002/0056008 A1 * | 5/2002 | Keane et al. | 709/245 |
| 2002/0069272 A1 * | 6/2002 | Kim et al. | 709/221 |
| 2002/0069274 A1 | 6/2002 | Tindal et al. | |
| 2002/0156828 A1 | 10/2002 | Ishizaki et al. | |
| 2002/0156867 A1 * | 10/2002 | Iwami | 709/218 |
| 2003/0097370 A1 | 5/2003 | Yamamoto | |

OTHER PUBLICATIONS

Web Page: "Virtual Private Networks On Vendor Independent Networks", IBM Technical Disclosure Bulletin, Dated Sep. 1992. Printed: Apr. 20, 2001, pp. 326-329. URL:http://www.delphion.com/tdbs/tdb?&order=92A+62488.

(Continued)

Primary Examiner—Glenton B. Burgess
Assistant Examiner—Philip Chea
(74) Attorney, Agent, or Firm—Sughrue Mion, PLLC; Pavel Pogodin, Esq.

(57) ABSTRACT

Techniques for creation, operation, management, and access control of network-based storage services are described. Specific embodiments provide improved efficiency of the service management tasks used for designing, operating and accounting the robust and profitable network services, for example. In representative embodiments, techniques for constructing integrated network and storage services are provided. In a specific embodiment, the service comprises of three major service components: virtual private networks (VPN), applications servers and storage area networks (SAN). Each of these service components has its own customer identification information, such as VPN identifier for VPN services, process identifier for application servers and logical unit number (LUN) for storage devices.

15 Claims, 11 Drawing Sheets

OTHER PUBLICATIONS

Schneider, J.M., T. Preub, and P.S. Nielsen, "Management of Virtual Private Networks for Integrated Broadbband Communication", Conference Proceedings on Communications Architectures, Protocol and Applications, 1993, pp. 224-237.

E. Rosen, et al. "BGP/MPLS VPNs", Informational Internet Memo dated Mar. 1999, RFC 2547, 22 pages URL: http://www.ietf.org/rfc/rfc2547.txt?number=2547.

Jeffrey C, PWU, Advisory Action, Aug. 1, 2005, 2 pages, U.S. Appl. No. 09/841,710, filed Apr. 24, 2001, U.S. Patent Office, United States.

Thomas J. Mauro, Jr., Office Action, Mar. 14, 2005, 18 pages, U.S. Appl. No. 09/841,710, filed Apr. 24, 2001, U.S. Patent Office, United States.

Thomas J. Mauro, Jr., Office Action, Aug. 23, 2004, 22 pages, U.S. Appl. No. 09/841,710, filed Apr. 24, 2001, U.S. Patent Office, United States.

* cited by examiner

SYSTEM CONFIGURATION

VPN MANAGEMENT SYSTEM

INTEGRATED SERVICE MANAGEMENT SYSTEM (ISMS)

| Subsystem name | Address |
|---|---|
| VPN subsystem | 192.168.1.11 |
| Server subsystem | 192.168.1.12 |
| Storage subsystem | 192.168.1.13 |

*FIG. 4*
SERVICE CONFIGURATION TABLE

| VPN ID | Site | Address 1 | Address 2 | Protocol | Internet | VLAN ID |
|---|---|---|---|---|---|---|
| VR-A | Aa | IP(Aa) | IP(VR-A) | PP2P | YES | VID-A |
| | Ab | IP(Ab) | IP(VR-A) | PP2P | YES | |
| VR-B | Ba | IP(Ba) | IP(VR-B) | IPsec | YES | VID-B |
| | Bb | IP(Bb) | IP(VR-B) | IPsec | No | |
| VR-C | Ca | IP(Ca) | IP(VR-C) | L2TP | No | VID-C |
| | Cb | IP(Cb) | IP(VR-C) | L2TP | No | |
| VR-D | Da | IP(Da) | IP(VR-D) | IPsec | YES | VID-D |
| | Db | IP(Db) | IP(VR-D) | IPsec | YES | |

*FIG. 5*
VPN TABLE

| SERVER | Address | VLAN ID | Application | OS | CPU |
|---|---|---|---|---|---|
| S-Aa | IP(S-Aa) | VID-A | WWW | OS-1 | 1GHz |
| S-Ab | IP(S-Ab) | | Email | OS-1 | 1GHz |
| S-B | IP(S-B) | VID-B | WWW/Email | OS-2 | 866MHz |
| S-CD | IP(S-CD) | VID-CD | Email/Calendar | OS-3 | 750MHz |

*FIG. 6*
SERVER TABLE

| Volume | Port | Server allowed | Capacity | Access |
|---|---|---|---|---|
| V-Aa | P(V-Aa) | S-Aa, S-Ab | 100GB | Read only |
| V-Ab | P(V-Ab) | S-Aa, S-Ab | 100GB | Read only |
| V-B | P(V-B) | S-B | 50GB | Read only |
| V-CDa | P(V-CDa) | S-CD | 30GB | Read/Write |
| V-CDb | P(V-CDb) | S-CD | 30GB | Read only |

*FIG. 7*
STORAGE TABLE

| Customer | VPN | Server | Volume |
|---|---|---|---|
| Customer A | VR-A | S-Aa, S-Ab | V-Aa, V-Ab |
| Customer B | VR-B | S-B | V-B |
| Customer C | VR-C | S-CD | V-CDa, V-CDb |
| Customer D | VR-D | S-CD | V-CDa, V-CDb |

*FIG. 8*
SERVICE MAPPING TABLE

| Customer | VPN | Server | Volume |
|---|---|---|---|
| Customer A | Normal | Normal | Normal |
| Customer B | Normal | Normal | Normal |
| Customer C | Normal | Normal | Fault |
| Customer D | Normal | Normal | Normal |

*FIG. 9*
SERVICE STATUS TABLE

SYSTEM CONFIGURATION WITH LPAR

FIG. 15
LPAR AND HBA

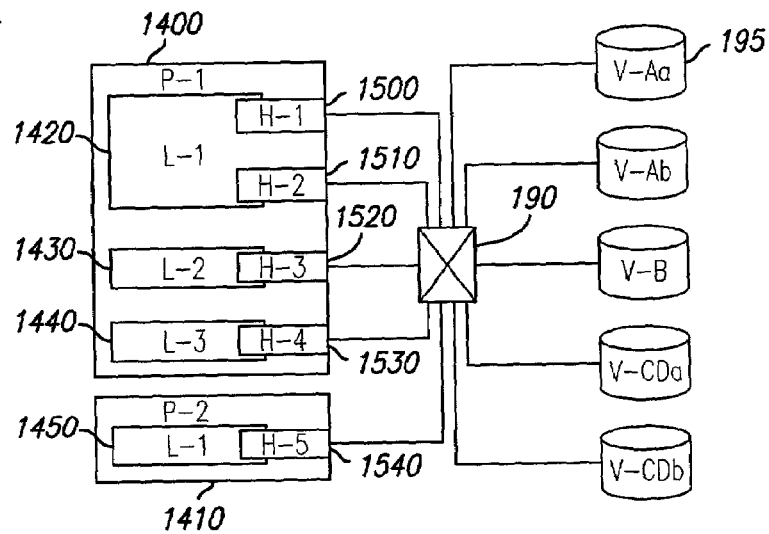

FIG. 16
SERVER TABLE WITH LPAR

| Server | Address | Physical Server | VLAN ID | LPAR ID | HBA ID | Application | OS | CPU |
|---|---|---|---|---|---|---|---|---|
| S-Aa | IP(S-Aa) | P-1 | VID-A | L-1 | H-1 | WWW | OS-1 | 1GHz |
|  |  |  |  |  | H-2 |  |  |  |
| S-Ab | IP(S-Ab) |  |  | L-2 | H-3 | Email | OS-1 | 1GHz |
| S-B | IP(S-B) |  | VID-B | L-3 | H-4 | WWW/Email | OS-2 | 866MHz |
| S-CD | IP(S-CD) | P-2 | VID-CD | L-1 | H-5 | Email/Calendar | OS-3 | 750MHz |
|  |  |  |  |  |  | Email/Calendar | OS-1 | 750MHz |

FIG. 17
STORAGE TABLE WITH HBA IDENTIFICATION

| Volume | Port | HBA allowed | Capacity | Access |
|---|---|---|---|---|
| V-Aa | P(V-Aa) | H-1, H-2, H-3 | 100GB | Read only |
| V-Ab | P(V-Ab) | H-1, H-2, H-3 | 100GB | Read only |
| V-B | P(V-B) | H-4 | 50GB | Read only |
| V-CDa | P(V-CDa) | H-5 | 30GB | Read/Write |
| V-CDb | P(V-CDb) | H-5 | 30GB | Read only |

FIG. 20
REMOTE DIAGNOSTICS MONITORING ITEMS

| ITEM | CONTENTS |
|---|---|
| I/O STATUS DATA | • CURRENT STATUS OF DIGITAL INPUT/OUTPUT & ANALOG INPUT/OUTPUT<br>• WAFER POSITION DATA<br>• PROCESS EXECUTION STATUS |
| LOG DATA | • PC-MC (#1) COMMUNICATION LOG<br>• GEM COMMUNICATION LOG<br>• WAFER MOVE EVENT LOG<br>• MC TASK EXECUTION LOG<br>• LOT MANAGEMENT DATA |
| RECORDS | • SERVICE SEQUENCE MEASUREMENT DATA<br>(LEAK RATE, MFC FLOW RATE...ETC)<br>• MAINTENANCE WARNING DATA<br>(CONSUMABLE PARTS, NUMBER OF PRODUCT WAFERS, RF TIME ACCUMULATION...ETC) |
| PARAMETERS | • SYSTEM PARAMETERS/USER PARAMETERS |
| RECIPE | • ETCHING RECIPE/ASHING RECIPE<br>(GAS FLOW RATE, PRESSURE, RF POWER, STEP TIME...ETC) |

FIG. 21
DISCLOSURE LEVEL CONFIGURATION TABLE 2100

| CUSTOMER | DISCLOSURE LEVEL | A | B | C | OPERATOR | |
|---|---|---|---|---|---|---|
| A | 0 | R/W | NO | NO | R/W | 2102 |
| A | 1 | R/W | NO | NO | R/O | 2104 |
| A | 2 | R/W | NO | NO | NO | 2106 |
| A | 3 | R/W | NO | NO | NO | 2108 |
| B | (ABBREVIATED) | | | | | |
| C | | | | | | |

INTEGRATED SERVICE MANAGEMENT SYSTEM FOR REMOTE CUSTOMER SUPPORT

BACKGROUND OF THE INVENTION

The present invention relates generally to techniques for managing storage, and in particular to techniques for creation, operation, management, and access control of network-based storage services in customer support operations.

Conventional network-based value-added services comprises of more than one service components. For example, outsourcing service of enterprise application over Internet involves network access services via the Internet, hosting service of Web servers and database servers and storage management services. Each service component may be provided by different service providers or may be served by one consolidated service provider. An added dimension includes the provision of customer support services to equipment installed in a customer facility. Computer networks have made it possible for off site customer support personnel to obtain information about equipment installed in customer facilities. While certain advantages to such conventional approaches are perceived, opportunities for further improvement exist. For example, according to conventional network management technology, managing such complicated service systems, to keep the service up and running, can be a challenging task to the service operators. Further, security and access control issues arise with any network access to equipment.

What is needed are improved techniques for creation, operation, management, and access control of network-based storage services in customer support operations.

SUMMARY OF THE INVENTION

The present invention provides techniques for creation, operation, management, and access control of network-based storage services in customer support operations. Specific embodiments provide improved efficiency of the service management tasks used for designing, operating and accounting the robust and profitable network services, for example. In representative embodiments, techniques for constructing integrated network and storage services are provided. In a specific embodiment, the service comprises of three major service components: virtual private networks (VPN), application servers and storage area networks (SAN). Each of these service components has its own customer identification information, such as VPN identifier for VPN services, process identifier for application servers and logical unit number (LUN) for storage devices. Access to equipment installed in a customer's site by an off site maintenance operator can be provided by virtue of virtual private network and logical partitioning technology according to specific embodiments of the present invention.

In some specific embodiments, service customers are connected to the service provider through VPN. The VPN path that connects customer sites and the data center of the service provider are terminated on a VPN termination device or a VPN router. Within the VPN router, multiple routing processing programs or virtual routers (VR) run independently. The VPN router is connected to the application servers via virtual LAN (VLAN) switch. These application servers are then connected to the service provider's SAN.

The integrated service management system collects management information from individual management systems corresponding to each service components (VPN, servers and SAN) and holds mappings or relationship information between resources in each service component and the customer who is allowed to use those resources. For example, VPN management system is responsible for mapping between VPN customer and VPN path used by that customer. Similarly, server management systems assign a number of servers to a certain customer. Integrated service management systems collect this kind of mapping information between customers and resources within service components. An application programming interface (API), enables software developers to implement management applications using the functionality of the integrated service management systems.

In a representative embodiment according to the present invention, a system is provided. The system comprises a connection to a virtual private network, and a router, which is connected to the virtual private network. The router maintains at least one virtual router for a client. The system further comprises at least one server, and a virtual LAN switch, which is connected to the router. The server can be apportioned into one or more logical partitions. The virtual LAN switch provides selectable forwarding for information from the router to at least one logical partition of the server. The system also includes at least one volume and an FC switch. The volume(s) accept information for storage thereon. The information has a shared portion and a non-shared portion. The FC switch provides selectable interconnection between the at least one logical partitions of the server and the at least one volume, so that information received from a plurality of sources via the virtual private network is directed to a particular virtual router for each of the sources by the router. In some specific embodiments, a virtual private network management system controls operation of the router. The information is then directed to a particular one of the logical partitions of the server for each of the sources by the virtual LAN switch. In some specific embodiments, a server management system controls operation of the virtual LAN switch. The information is then directed to a particular volume for each of the sources by the FC switch. In some specific embodiments, a storage management system controls operation of the FC switch. The shared portion of the information is accessible via the administration server under control of the sources. Control can be provided by a set of access permissions or the like in various specific embodiments.

In a representative specific embodiment, in which a virtual private network management system is used to control the router, the virtual private network management system comprises a network interface module, that receives commands from an integrated service management system, a service order processing module, that analyzes and executes the commands, updates a table of virtual private network information, and sends new configuration information to the router through a control module. In some specific embodiments, the virtual service management system further comprises a virtual private network table. The virtual private network table has a VPN ID that identifies a specific VPN, an Address 1 and an Address 2 that hold IP addresses of two end points of the specific VPN, a Protocol that specifies a VPN protocol that is used on the specific VPN, an Internet that indicates whether access to public Internet is permitted, and a VLAN ID that is assigned to packets received over the specific VPN.

In another representative embodiment, an integrated service management system is used to control operation of other management systems. In a specific embodiment, the integrated service management system comprises a network interface module that receives requests to change configuration, a service order processing module that analyzes and executes requests to change configuration received by the network interface module, updates related table cache in a service management database, and sends new configuration information using the network interface module. In some specific embodiments, the integrated service management system further comprises a service configuration table that stores destination information. In select embodiments, the integrated service management system further comprises a server table that stores a server table, said server table having a server identification, an address, a physical server identifier, a virtual LAN identification, a logical partition (LPAR) identification, a host bus adaptor (HBA) identification, an application identification, an operating system identifier, and a CPU information, for example. In some specific embodiments, the integrated service management system further comprises a storage table that stores storage table having a volume identifier, a port identifier, an allowed host bus adapter(s) (HBAs) identifier, a capacity identifier, and an access information. The integrated service management system further comprises a service mapping table that stores a customer identifier, a virtual private network identifier, a server identifier, and a volume identifier in some specific embodiments. In some embodiments, the integrated service management system further comprises a service status table that stores a customer identifier, a virtual private network status, a server status, and a volume status.

In some specific embodiments, an operator console application sends a request command to change service configuration to the integrated management system. In select specific embodiments, a customer portal application sends a request command to change service configuration to the integrated management system.

In a further representative embodiment, a method is provided. The method comprises receiving a request to access information stored in an integrated storage and networking system. Determining based upon configuration tables comprising a mapping between a logical partition and one or more of host based adaptors (HBAs) attached thereto an appropriate volume to route the request is also part of the method. Further, the method includes determining based upon an access permission whether the request is authorized to the volume; and permitting access based upon the request, if the request is authorized. Permitting the access enables an operator to diagnose equipment in a remotely located installation.

In a further representative embodiment, a method is provided. The method comprises assigning to customer data a set of access permissions. Receiving requests to access the customer data is also part of the method. Further, based upon configuration tables reflecting a mapping between a logical partition and one or more of HBAs attached thereto, a volume to access is determined. The method also includes permitting access to the volume based upon the set of access permissions. The request to access the customer data is made by an operator attempting to diagnose equipment installed in a remote customer site.

In a further representative embodiment, a method is provided. The method comprises receiving at a subsystem manager a request to change to a new configuration for one or more of storage devices of an integrated storage and networking system. Analyzing the request to determine a new configuration for the one or more of storage devices of the integrated storage and networking system is also part of the method. Further, the method also includes updating configuration tables to reflect the new configuration. The configuration tables comprise a mapping between a logical partition and one or more of HBAs attached thereto. Sending commands to a fibre channel switch to implement the new configuration is also part of the method. The method also includes receiving requests by an operator to access information associated with the logical partition. Determining based upon an access permission whether the operator has permission to access the information and permitting access to the operator to the information if the operator has permission are also part of the method.

In another representative embodiment, an apparatus is provided. The apparatus comprises a means for selectably interconnecting between at least one logical partition of at least one server and at least one volume in a storage unit, so that information received from one or more of sources is directed to a particular one of a plurality of virtual routers. Further, a means for directing the information from the particular one of a plurality of virtual routers to a particular one of the at least one logical partitions of the at least one server is part of the apparatus. The apparatus also includes a means for directing the information to a particular volume for each of the sources and a means for controlling access to a shared portion of the information via an administration server.

Numerous benefits are achieved by way of the present invention over conventional techniques. Specific embodiments according to the present invention provide the capability to integrate and manage customer identification information for each of the service components as a whole by the integrated service management systems. This enables the service operator to configure, monitor and manage the service on per-customer or per-service basis. By selecting a certain customer, the operator can focus on the end-to-end service from the customer site to access network, to application servers and storage devices pertaining to the selected customer.

As customer identification information for each of the service components is automatically mapped by the integrated service management systems, in specific embodiments, it is not necessary for the operator of the service provider to manually configure each service component.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 4 shows the service configuration table in a specific embodiment of the present invention.

FIG. 5 shows the VPN table 500 that resides in the VPN database 210 of VPN SMS 200 in a specific embodiment of the present invention.

FIG. 6 shows the server table 600 that resides in the server database of server SMS in a specific embodiment of the present invention.

FIG. 7 shows the storage table that resides in the storage database of storage SMS in a specific embodiment of the present invention.

FIG. 8 shows the service mapping table that resides in the service management database 310 in the ISMS 300 in a specific embodiment of the present invention.

FIG. 9 shows the service status table that resides in the service management database 310 in the ISMS 300 in a specific embodiment of the present invention.

FIG. 15 shows a representative relationship between logical partitions and host bus adaptors (HBAs) in a specific embodiment of the present invention.

FIG. 16 shows a representative server table for managing a mapping between application servers, logical partitions and HBAs in a specific embodiment of the present invention.

FIG. 17 shows a representative storage table useful in a specific embodiment of the present invention.

FIG. 20 shows representative diagnostic information collected in the service in a specific embodiment of the present invention.

FIG. 21 shows a representative disclosure level configuration table 2100 in a specific embodiment of the present invention.

DESCRIPTION OF THE SPECIFIC EMBODIMENTS

The present invention provides techniques for creation, operation and management of network-based storage services. Specific embodiments provide improved efficiency of the service management tasks used for designing, operating and accounting the robust and profitable network services, for example. In representative embodiments, techniques for constructing integrated network and storage services are provided. In a specific embodiment, the service comprises of three major service components: virtual private networks (VPN), application servers and storage area networks (SAN). Each of these service components has its own customer identification information, such as VPN identifier for VPN services, process identifier for application servers and logical unit number (LUN) for storage devices.

In a U.S. Pat. Ser. No. 6,205,488, entitled "Internet protocol virtual private network realization using multi-protocol label switching tunnels," which is incorporated by reference herein in its entirety for all purposes, one method for constructing VPN over a packet-based network using multi-protocol label switching (MPLS) technology is described. There are also several techniques to build a virtual private network over public IP networks. For example, IPsec, point-to-point tunneling protocol (PPTP), and layer 2 tunneling protocol (L2TP) may be used to set up a tunneling path between customer-owned network equipment, such as VPN routers and firewalls. Other forms of VPN are a network-based VPN. An example of this type of VPN is described in RFC2547, "BGP/MPLS VPNs," which is incorporated by reference herein in its entirety for all purposes.

However, a need still exists to support integration and mapping between VPN and application services. Further, other service components have their own service management systems. For example, storage area network (SAN) can be managed using SAN management software.

According to the present invention, a plurality of services is used to combine virtual private network (VPN) services, application services and storage access services. This service is referred to as "Secure storage access service" (SSAS) in this document.

Figure 1:
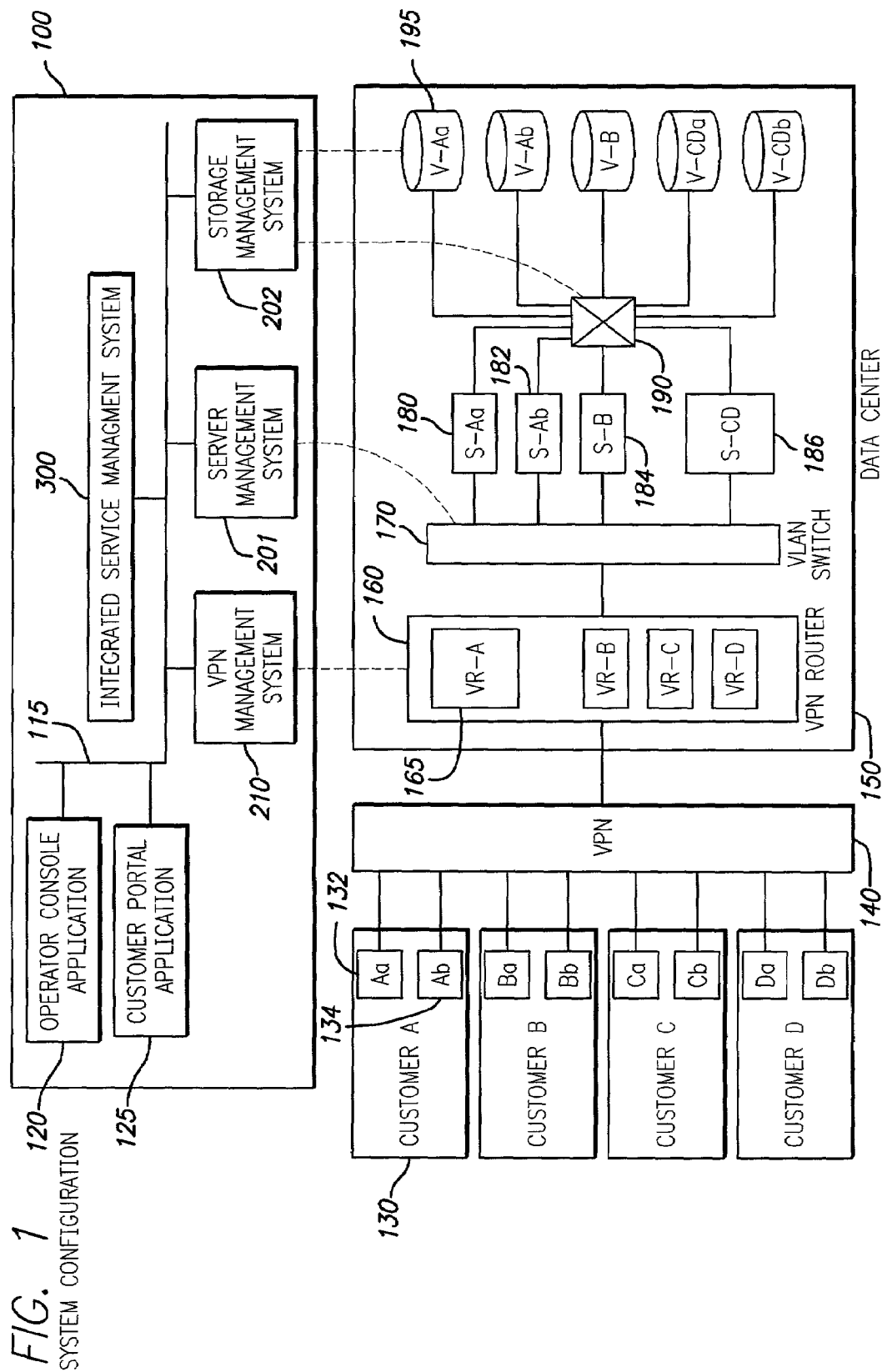
FIG. 1 shows the system overview of SSAS in a specific embodiment of the present invention.

FIG. 1 shows the system overview of SSAS in a specific embodiment of the present invention. Although SSAS may be comprised of one or more service components, in a specific embodiment the SASS comprises of three service components, each of which is described below.

Virtual private network (VPN) service provides secure network path between the customer site and the data center of the service provider over the shared public network such as the Internet. Traffic that goes through VPN path may or may not be encrypted to prevent eavesdropping in various specific embodiments. Each of the VPN service customers has one or more sites to be connected to the VPN. For example, in FIG. 1, Customer A 130 has two sites Aa 132 and Ab 134. Each VPN site is an end point of a VPN path. The other end point of the VPN path is on the VPN router 160, which resides in the data center 150 of the service provider.

The VPN router 160 in the data center 150 aggregate multiple VPN paths, identify the customer by VPN ID, and direct the traffic received from the customer to the virtual LAN (VLAN) switch 170. Within the VPN router 160, there are multiple virtual router (VR) programs, each serving the different VPN customers. For example, in FIG. 1, the VPN paths from service customer A 130 are terminated at the virtual router A 165 in the VPN router 160. Similarly, the VPN paths from customer B are connected to the VR B. Because each VR has its own routing table and other network resources dedicated to the customer it serves, packets from each VPN customer are clearly separated from the network point of view. This enables, for example, two different customers to use the same overlapping IP address spaces within a private address range.

When a VR A 165 receives packets from one of VPN path of customer A 130, it then adds to them the VLAN tag for customer A and sends them to the VLAN switch. The VLAN tag is the information added to the LAN frame so that more than two logically independent networks can be overlaid on the same LAN segment. The more detailed specification of VLAN tag is defined in the IEEE 803.1 q standard. The VPN service is one of the service components or subsystems that comprise SSAS and is managed by the VPN management system 210, which will be described herein below.

Application service comprises of one or more application servers ("Servers"). Each service customer is assigned to one or more Servers. For a larger service customer who requires a lot of server processing capacity such as CPU time, more than one server can be assigned for load balancing. On the other hand, for a smaller customer who doesn't use much CPU and wants to reduce the service cost, one application server can be shared among more than one service customers. In the latter case, more than one application processes may be run on the shared application server.

In FIG. 1, customer A uses two servers S-Aa 180 and S-Ab 182 while customers C and D share one server S-CD 186. Each application server belongs to a certain VLAN. As VLAN switch 170 on the VLAN segment is configured to transfer VLAN-tagged packets from VPN router 160 to an appropriate server connected to the VLAN segment, it is not necessary for servers to know to which VLAN they belong.

Each application server has one or more host bus adapters (HBA) that connect the server to a storage area network (SAN). From the SAN point of view, each server is identified by its HBA address or port. In the configuration illustrated by FIG. 1, each server is connected to a fibre channel (FC) switch 190, which performs the switching functions of the SAN. Application service is one of the service components or subsystems that comprise SSAS and is managed by the server management system 211, which will be described herein below.

Storage service comprises of multiple storage devices or volumes. Each storage volume is configured to accept accesses from a specific application server. Application servers and storage volumes are connected via the storage area network (SAN). In FIG. 1, FC switch 190, of the SAN, is used to connect servers and volumes. In order to segregate servers and volumes for different service customers, the FC switch 190 and/or storage volumes are configured so that access to a specific storage volume is restricted to one or more specific servers. When incorporated into FC switches, this functionality is called "port zoning." When incorporated into storage devices, this functionality is often called "LUN security," where LUN stands for logical unit number.

In FIG. 1, server S-Aa 180 and S-Ab 182 can access volume V-Aa and V-Ab. Server S-B 184 uses volume V-B. Server S-CD 186 gains access to volumes V-CDa and V-CDb. The FC switch 190 is configured to manage the storage access as described above. Storage service is one of the service components or subsystems that comprise SSAS and is managed by the storage management system 212, which will be described herein below.

Integrated service management system (ISMS) 300 is the management server and programs running on it. Integrated service management system (ISMS) 300 communicates with the subsystem management system (SMS) that controls and manages each service component comprising the SSAS. The ISMS 300 includes application programming interfaces that can be used to develop application programs such as an operator console program. Service provider operators can communicate with ISMS 300 by using operator console application 120. Service customers can communicate with ISMS 300 by using customer portal applications 125. The ISMS communicates with other management components such as SMS and applications through management network 115.

Figure 2:
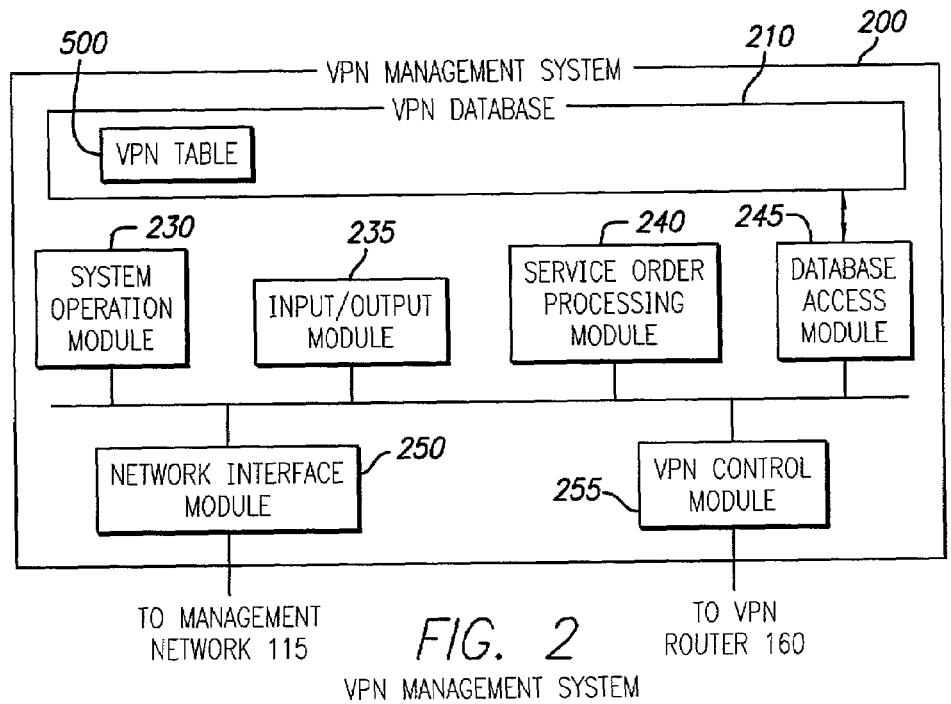
FIG. 2 shows the VPN management system as an example of subsystem management system in a specific embodiment of the present invention.

FIG. 2 shows the VPN management system as an example of a subsystem management system in a specific embodiment of the present invention. Other subsystem management systems, such as server management system 201 and storage management system 202, for example, may be similar to the VPN management system (VPN SMS). The VPN SMS 200 has a network interface module 250 that is connected to the management network 115 and used to send or receive command packet to or from the ISMS 300. The VPN SMS 200 also has a VPN control module 255 that is connected to the VPN router 160 and used to communicate with the VPN router 160 to configure the device.

The information for mapping between VPN path and VLAN tags associated with the VPN path is stored in a VPN table 500 in a VPN database 210. The contents of the VPN table 500 will be described later with reference to FIG. 5. System operation module 230 controls the starting up and shutting down of the VPN SMS 200, and executes common tasks including operating system tasks. Input/output module 350 processes the input/output events of the VPN SMS 200.

Service order processing module 240 is responsible for processing service orders received by network interface module 250. When ISMS 300 sends a request command or a service order to VPN SMS 200 in order to change VPN configuration, the command packet is received by the network interface module 250 of VPN SMS 200. Then, the service order processing module 240 analyzes and executes the command request, updates the VPN table 500 and sends the new configuration information to the VPN router 160 through the VPN control module 255. A database access module 245 is used to read data from or write data into VPN database 210 as requested by other modules of VPN SMS 200.

Figure 3:
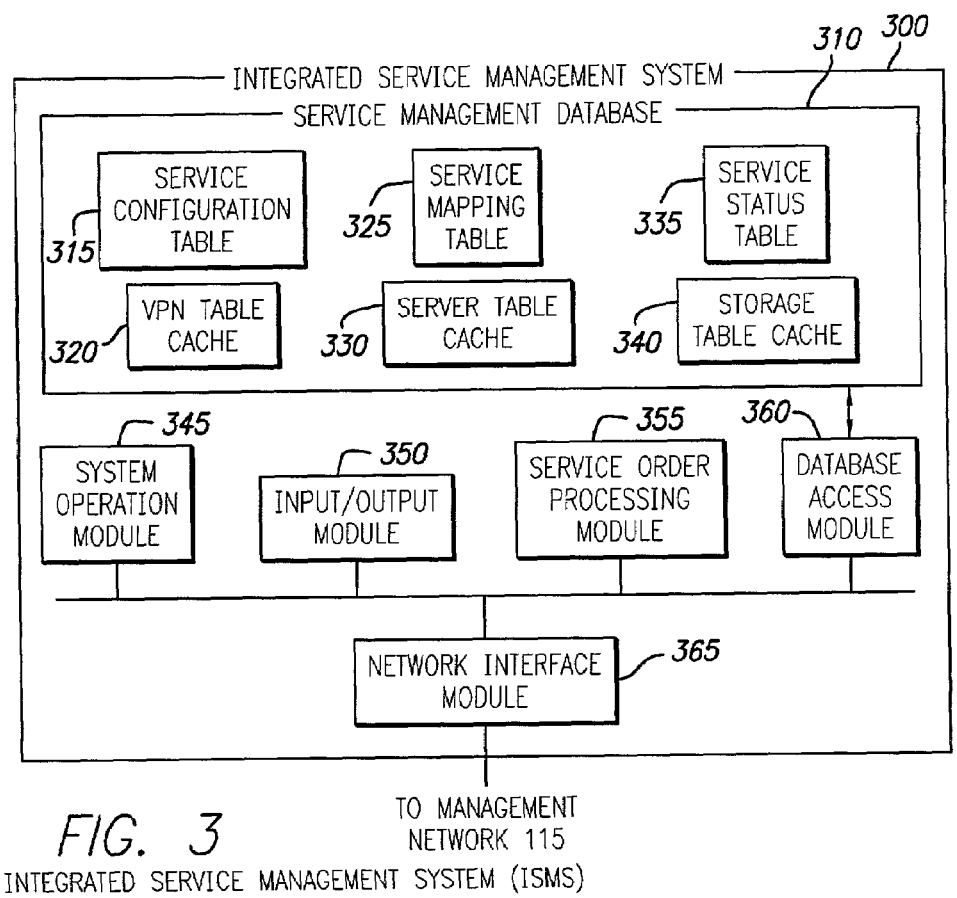
FIG. 3 shows the Integrated Service Management System (ISMS) in a specific embodiment of the present invention.

FIG. 3 shows the Integrated Service Management System (ISMS) in a specific embodiment of the present invention. The ISMS 300 has a network interface module 365 that is connected to the management network 115 and used to send or receive command packets to or from SMSs, such as VPN management system 200, for example. Input/output module 350 processes the input/output events of the ISMS 300.

A service order processing module 355 is responsible for processing service orders received by network interface module 365. When operator console application 120 or customer portal application 125 sends a request command or a service order to ISMS 300 in order to change service configuration, the command packet is received by the network interface module 365 of ISMS 300. Then, the service order processing module 355 analyzes and executes the command request, updates related table caches in service management database 310 and sends the new configuration information to the related SMSs through the network interface module 365.

A database access module 360 is used to read data from or write data into the service management database 310 as requested by other modules of the ISMS 300. Stored within the service management database 310 are a number of tables, which ISMS 300 uses to control and manage the SSAS. Service configuration table 315, service mapping table 325, and service status table 335 are described below.

The ISMS 300 comprises a VPN table cache 320, server table cache 330 and storage table cache 340, which are copies of the corresponding tables managed by SMSs respectively. For example, VPN table cache 320 is a copy of a VPN table 500 that is stored in VPN SMS 200 and collected by ISMS 300. The contents of VPN table, server table and storage table are described below.

FIG. 4 shows the service configuration table in a specific embodiment of the present invention. Service configuration table 400 contains the configuration information that ISMS 300 uses to identify SMSs to communicate with. In a specific embodiment, ISMS 300 communicates with three subsystems: VPN subsystem, server subsystem, and storage subsystem. The operator of the service system enters the SMS IP address of each subsystem in the service configuration table 400. When starting up, ISMS 300 looks up the service configuration table 400 to establish communication connections to each SMS.

FIG. 5 shows the VPN table 500 that resides in the VPN database 210 of VPN SMS 200 in a specific embodiment of the present invention. The information contained in VPN table 500 is collected and stored by ISMS 300. The VPN table 500 contains the configuration information that VPN subsystem uses to configure the VPN router 160. Within the VPN table 500, "VPN ID" identifies to which VPN the site belongs. "Address 1" and "Address 2" hold the IP addresses of the two end points of the VPN path or tunnel, respectively. "Protocol" specifies which VPN protocol is used on the VPN path for this site. "Internet" is a Boolean value that indicates whether or not the site is allowed to access public Internet, possibly through a firewall. "VLAN ID" is the VLAN tag value assigned to the packets received from this site over the VPN path.

FIG. 6 shows the server table 600 that resides in the server database of server SMS in a specific embodiment of the present invention. The server SMS 201 is similar to VPN SMS 200 in a specific embodiment. The information contained in server table 600 is collected and stored by ISMS 300 as well. Server table 600 contains the configuration information that the server subsystem uses to configure the VLAN switch 170. Within server table 600, "Server" identifies one of application servers within the server subsystem. "Address" holds the IP address of that server. "VLAN ID" is the VLAN tag value assigned to that server. "Application," "OS," and "CPU" indicate the application running on the server, operating systems of the server, and CPU processing capability such as CPU speed, respectively.

FIG. 7 shows the storage table that resides in the storage database of storage SMS in a specific embodiment of the present invention. The storage SMS 202 is similar to VPN SMS 200 in a specific embodiment. The information contained in storage table 700 is collected and stored by ISMS 300. This table contains the configuration information that the storage subsystem uses to configure the FC switch 190 and storage volumes. "Volume" identifies one of the storage volumes within the storage subsystem. "Port" holds the FC port address of the volume. "Server allowed" specifies those servers that are allowed to access this storage volume. "Capacity" and "Access" indicate the storage volume capacity and access control attribute of the volume, respectively.

FIG. 8 shows the service mapping table that resides in the service management database 310 in the ISMS 300 in a specific embodiment of the present invention. ISMS 300 constructs a single service management table from multiple tables collected from the SMSs that are connected to it. This table defines the mapping between service customer and resources in each subsystem. For example, customer A is mapped to VPN with VPN ID "VR-A," servers "S-Aa" and "S-Ab" and volume "V-Aa" and "V-Ab." When ISMS 300 configures the VPN settings for customer A, ISMS 300 looks up this table, determines VPN ID corresponding to customer A and then issues a command packet to VPN SMS 200 with the VPN ID.

In this way, ISMS 300 can accept the configuration command on a per-customer basis and translate it into the command request to the subsystems with subsystem specific identification information.

FIG. 9 shows the service status table that resides in the service management database 310 in the ISMS 300 in a specific embodiment of the present invention. When ISMS 300 receives the fault notification from one of SMSs connected to it, it looks up the service mapping table 800 of FIG. 8 and determines which customer is affected by the fault. For example, if the fault of storage volume V-B is received, by consulting the service mapping table 800, ISMS 300 determines that the fault affect the customer B. In this case, ISMS 300 update the service status table 900 by changing the Volume column of the customer B from "Normal" to "Fault." In this way, ISMS 300 can correlate the fault notifications from subsystems to the customer who is affected by the event.

Figure 10:
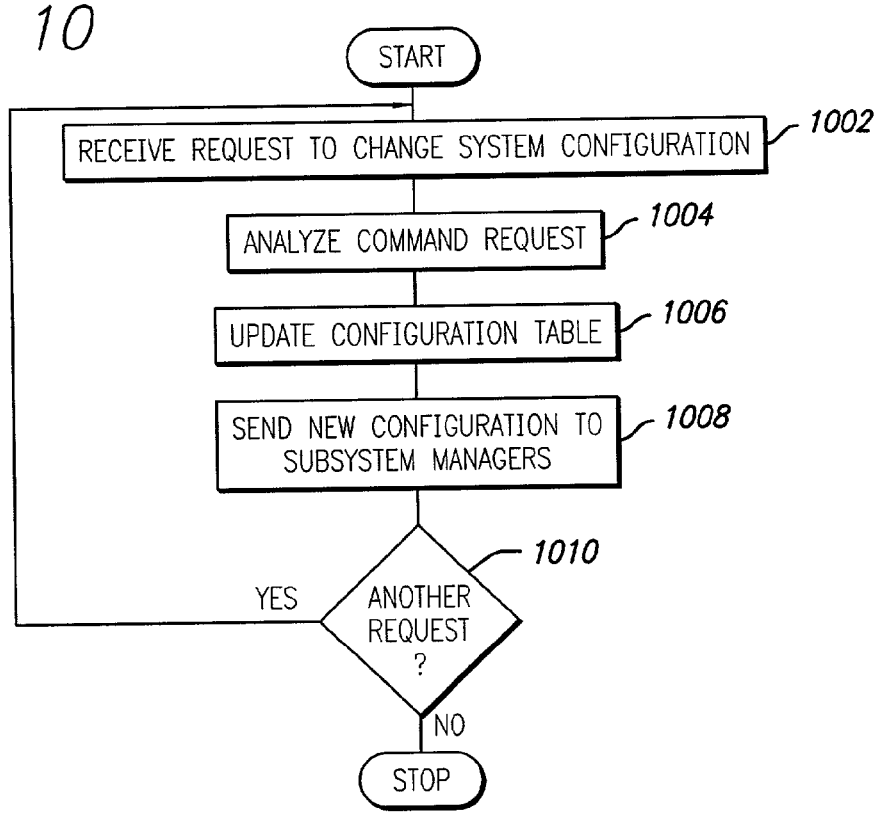
FIG. 10 shows a flowchart of representative integrated service management system processing in a specific embodiment of the present invention.

FIG. 10 shows a flowchart of representative integrated service management system processing in a specific embodiment of the present invention. As illustrated in FIG. 10, in a step 1002, a service order is received by the integrated service system 300. The service order can be created using an operator console application 120 or the customer portal application 125 to send a request command or a service order to the ISMS 300. Service orders can be used to change service configuration and the like, for example. The service order can be in the form of a command packet, which is received by the network interface module 365 of ISMS 300, for example. Then, in a step 1004, the command request is analyzed and executed. In a specific embodiment, service order processing module 355 analyzes the service order to determine the changes that need to be made to the subsystem configurations in order to implement the commands in the service order. Next, in a step 1006, the related table caches in the service management database 310 of the ISMS 300 are updated to reflect the new configuration. Then, in a step 1008, the new configuration information is sent out to the related SMSs through the network interface module 365, for example.

Figure 11:
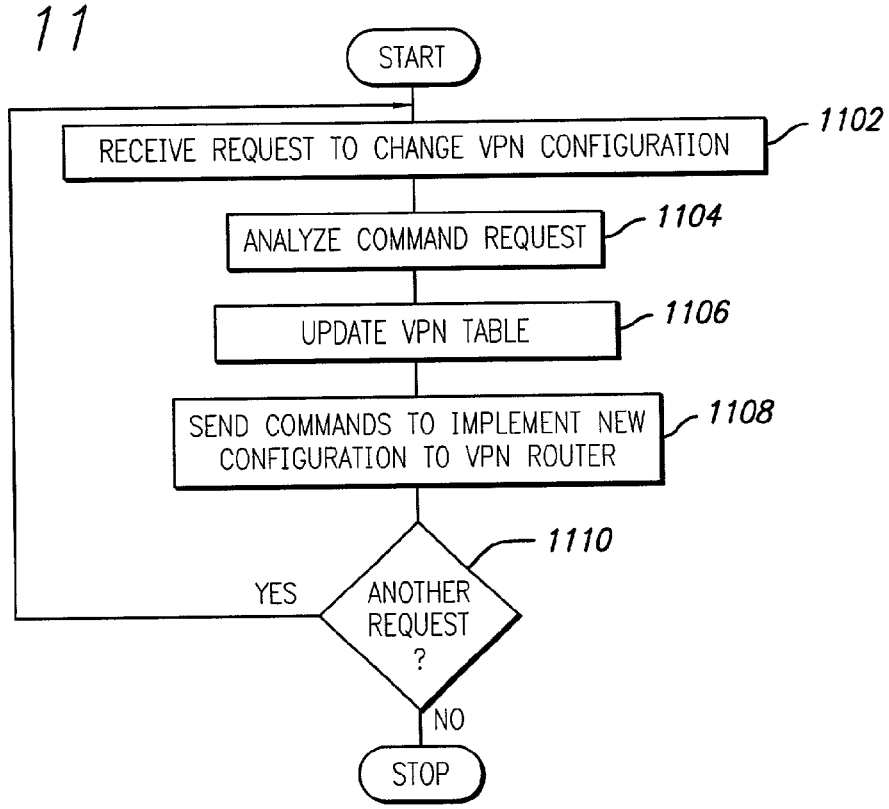
FIG. 11 shows a flowchart of representative virtual private network service management system processing in a specific embodiment of the present invention.

FIG. 11 shows a flowchart of representative virtual private network service management system processing in a specific embodiment of the present invention. As illustrated in FIG. 11, in a step 1102, a service order is received by the virtual private network management system 200. The service order is created by the ISMS 300 in order to implement a change in configuration responsive to receiving a service order from the operator console application 120 or the customer portal application 125, for example. The service order can be in the form of a command packet, which is received by the network interface module 250 of VPN SMS 200, for example. Then, in a step 1104, the service order is analyzed and executed. In a specific embodiment, service order processing module 240 analyzes the service order to determine the changes that need to be made to the VPN subsystem configuration in order to implement the commands within the service order. Next, in a step 1106, the VPN table 500 in the VPN database 210 of the VPN SMS 200 is updated to reflect the new configuration. Then, in a step 1108, instructions to implement the new configuration are sent out to the VPN router 160 through the VPN control module 255, for example.

Figure 12:
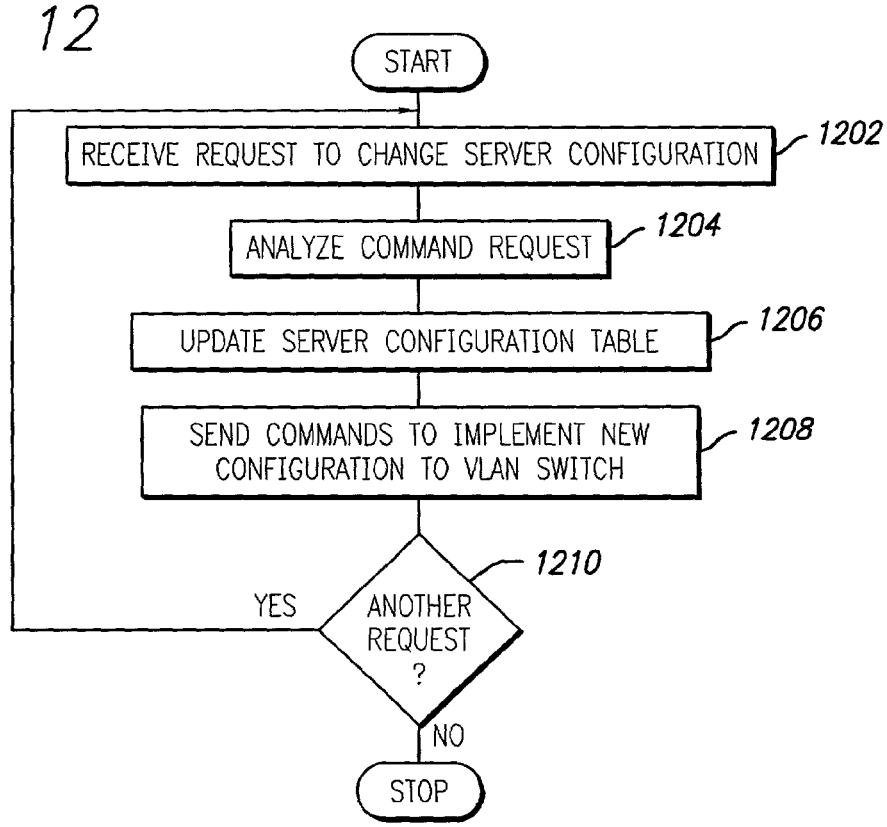
FIG. 12 shows a flowchart of representative server management system processing in a specific embodiment of the present invention.

FIG. 12 shows a flowchart of representative server management system processing in a specific embodiment of the present invention. As illustrated in FIG. 12, in a step 1202, a service order is received by the server management system 201. The service order is created by the ISMS 300 in order to implement a change in configuration responsive to receiving a service order from the operator console application 120 or the customer portal application 125, for example. The service order can be in the form of a command packet, which is received by the network interface module of the server SMS 201, for example. Then, in a step 1204, the service order is analyzed and executed. In a specific embodiment, a service order processing module of the server SMS 201 analyzes the service order to determine the changes that need to be made to the Server subsystem configuration in order to implement the commands within the service order. Next, in a step 1206, the server configuration table in the Server SMS 201 is updated to reflect the new configuration. This information is also contained in the server table cache 330 of ISMS 300. Then, in a step 1208, instructions to implement the new configuration are sent out to the VLAN switch 170 through a control module within the server SMS 201, for example.

Figure 13:
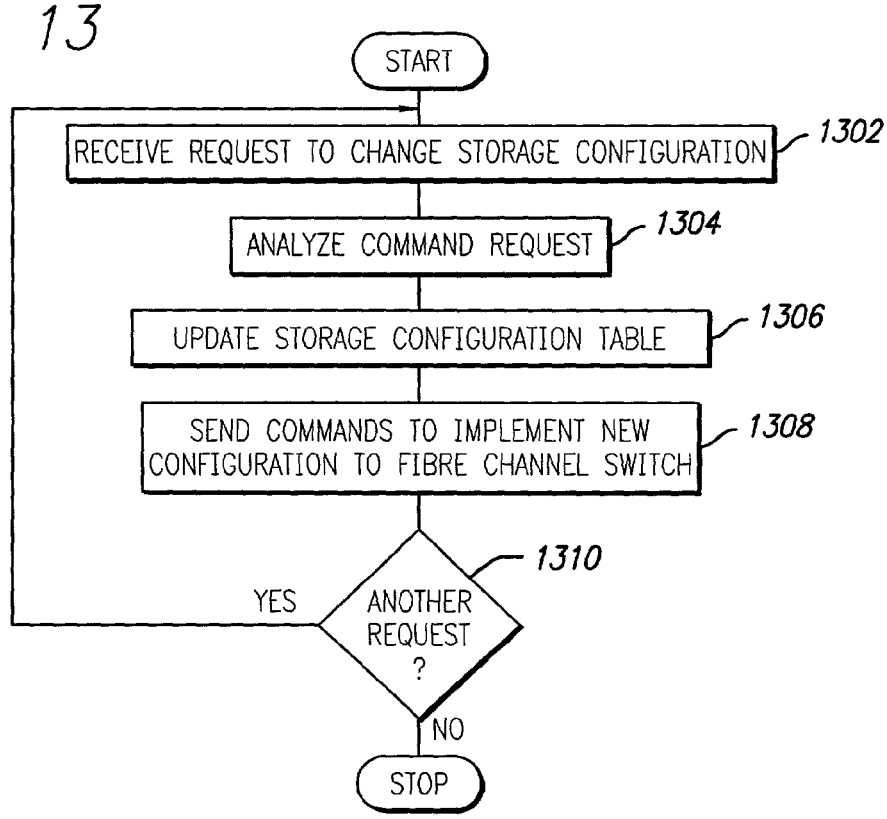
FIG. 13 shows a flowchart of representative storage management system processing in a specific embodiment of the present invention.

FIG. 13 shows a flowchart of representative storage management system processing in a specific embodiment of the present invention. As illustrated in FIG. 13, in a step 1302, a service order is received by the storage management system 202. The service order is created by the ISMS 300 in order to implement a change in configuration responsive to receiving a service order from the operator console application 120 or the customer portal application 125, for example. The service order can be in the form of a command packet, which is received by the network interface module of the storage SMS 202, for example. Then, in a step 1304, the service order is analyzed and executed. In a specific embodiment, a service order processing module of the storage SMS 202 analyzes the service order to determine the changes that need to be made to the storage subsystem configuration in order to implement the commands within the service order. Next, in a step 1306, the storage configuration table in the storage SMS 202 is updated to reflect the new configuration. This information is also contained in the storage table cache 340 of the ISMS 300. Then, in a step 1308, instructions to implement the new configuration are sent out to the FC switch 190 through a control module within the storage SMS 202, for example.

Logical Partitioning

In specific embodiments of the present invention, logical partitioning techniques may be applied to high-end application servers to provide enhanced security and access control. Some servers, especially those created for high-end market, have a capability called logical partitioning. A logical partition is a logical entity implemented on a single physical computer. It is possible to have more than one logical partition on a single physical computer. If multiple logical partitions reside on a computer, each one of the partitions is independent from the other. Each partition can contain a different operating system within it. In addition, application programs that run on a certain logical partition would not see any other applications that run on other logical partitions. Therefore, from an application's point of view, a logical partition acts as if it is a single independent computer system even though the logical partitions reside in the same physical computer.

By using logical partitioning, service providers can serve more customers with the same number of servers. This means that the service providers can save the floor space of data centers, which is becoming an increasingly scarce resource due to fast growing server needs. As each logical partition is logically separate, and there is no interaction between them, even if multiple customers share one physical server, these customers can preserve information confidentiality and avoid system crashes caused by other customers' actions.

Figure 14:
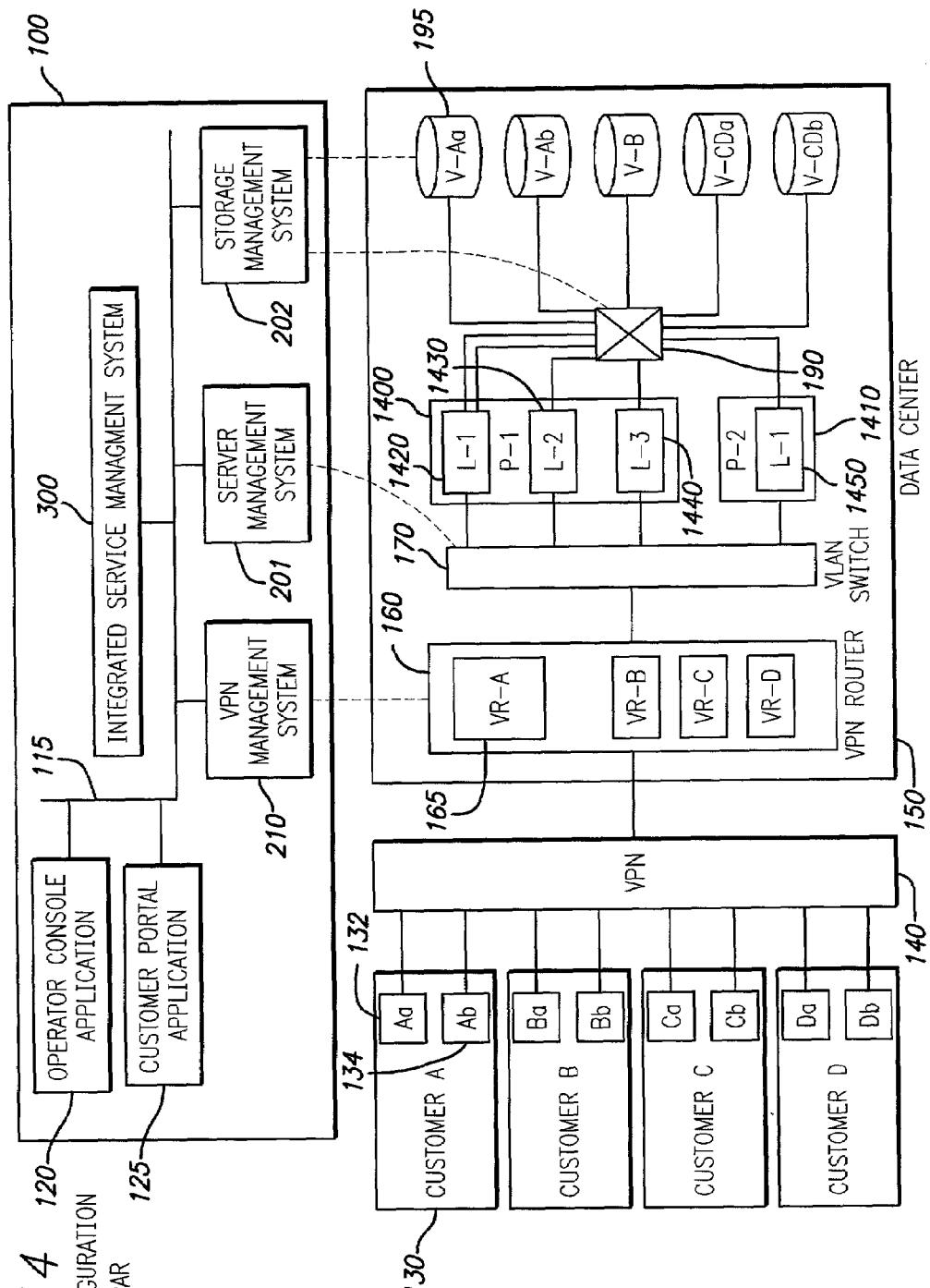
FIG. 14 shows a representative system configuration using LPAR capability in a specific embodiment of the present invention.

FIG. 14 shows a representative system configuration using LPAR capability in a specific embodiment of the present invention. In the illustrated specific embodiment of the present invention, application servers in SSAS have logical partitioning capabilities. A logical partition is identified by a combination of a physical server and a logical partition ID (LPAR ID). In FIG. 14, one physical server P-1 (1400) holds three logical partitions in it: L-1 (1420), L-2 (1430) and L-3 (1440). Another physical server P-2 (1410) holds a single logical partition L-1 (1450).

FIG. 15 shows a representative relationship between logical partitions and host bus adaptors (HBAs) in a specific embodiment of the present invention. A host bus adaptor (HBA) is an interface device that gives a server access to the storage area network. Because it is possible for one LPAR to have more than one HBA, server SMS 201 should be able to manage a mapping between a logical partition and one or more HBAs attached to it.

In the example shown in FIG. 15, a physical server P-1 (1400) contains three logical partitions, L-1 (1420), L-2 (1430) and L-3 (1440), while P-2 (1410) has a single logical partition, L-1 (1450). Physical server P-1 (1400) is equipped with four HBAs, H-1 (1500) through H-4 (1530). Among these four HBAs, H-1 (1500) and H-2 (1510) are associated with L-l (1420), and H-3 (1520) and H-4 (1530) are associated with L-2 (1430) and L-3 (1440), respectively. In physical server P-2 (1410), there is only one logical partition, L-1 (1450) and one HBA, H-5 (1540). Though it is not shown in this example, it is also possible for more than one logical partition to share the same HBA.

As access security in the storage area network is controlled on a per-HBA basis, the storage management subsystem manages which HBA is allowed to access which storage volumes.

FIG. 16 shows a representative server table for managing a mapping between application servers, logical partitions and HBAs in a specific embodiment of the present invention. As shown by FIG. 16, a server SMS 201 holds the server table 1600. Server table 1600 in FIG. 16 contains additional columns for storing information such as a physical server, a logical partition ID (LPAR ID) and an HBA ID.

Within server table 1600, "Server" identifies one of application servers within the server subsystem. "Address" holds the IP address of that server. "Physical Server" holds the id of the physical server in which the application server is contained. "VLAN ID" is the VLAN tag value assigned to that server. "LPAR ID" is the unique id that identifies the logical partition on which the application server runs. "HBA ID" specifies which HBA is attached to the logical partition. The actual value of HBA ID depends on the protocol used in the storage area network. For example, in the Fibre Channel based network, the world wide name of the HBA is used as an HBA ID. "Application," "OS," and "CPU" indicate the application running on the server, operating systems of the server, and CPU processing capability such as CPU speed, respectively.

Note that servers such as S-Aa, S-Ab and S-B, are logical notions of the application server. They are identified by a combination of a physical server and a logical partition in it. Thus, according to the configuration shown in FIG. 16, servers S-Aa, S-Ab and S-B are on the same physical computer P-1 (1400) and their LPAR IDs are L-1 (1420), L-2 (1430) and L-3 (1440), respectively. Server S-CD, on the other hand, is on the physical computer P-2 (1420), which holds a single logical partition L-1 (1450).

FIG. 17 shows a representative storage table useful in a specific embodiment of the present invention. The storage table 1700 can support embodiments using an LPAR configuration. It contains the configuration information that a storage management subsystem 202 uses to configure the FC switch 190 and storage volumes 195. Within storage table 1700, "Volume" identifies one of the storage volumes with in the storage subsystem. "Port" holds the FC port address of the volume. "HBA allowed" specifies those HBAs that are allowed to access this storage volume. "Capacity" and "Access" each indicates the storage volume capacity and access control attribute of the volume, respectively.

The ISMS 300 collects mapping information from server SMS 201 and storage SMS 202, and combines the mapping information into the service mapping table 800 of FIG. 8 and the service status table 900 of FIG. 9. The remaining operation is substantially similar to the processing of the specific embodiments discussed herein above with respect to FIGS. 10–13.

EXAMPLE APPLICATION

Specific embodiments of the invention disclosed herein can be applied to various kinds of network services in a broad array of applications. One such application of the present invention is in the area of outsourced monitoring and maintenance services of semiconductor manufacturing devices, for example. In a representative configuration, Semiconductor Device Manufacturing comprises of multiple customer sites and a centralized customer support center.

In an industry environment, such as the semiconductor manufacturing industry, a vendor of the manufacturing devices often desires to monitor and maintain their products installed in the customer premises. To monitor more than one customer sites and products installed therein, a manufacturing device vendor would like to have a centralized facility or a customer support center.

The customer support center is preferentially connected to more than one customer site via a virtual private network over the Internet. However, many other configurations are possible. Customers can access the customer support center via VPN and use the services provided by the center. The operator in the customer support center can also connect to the customer site and get information from manufacturing devices installed therein.

Figure 18:
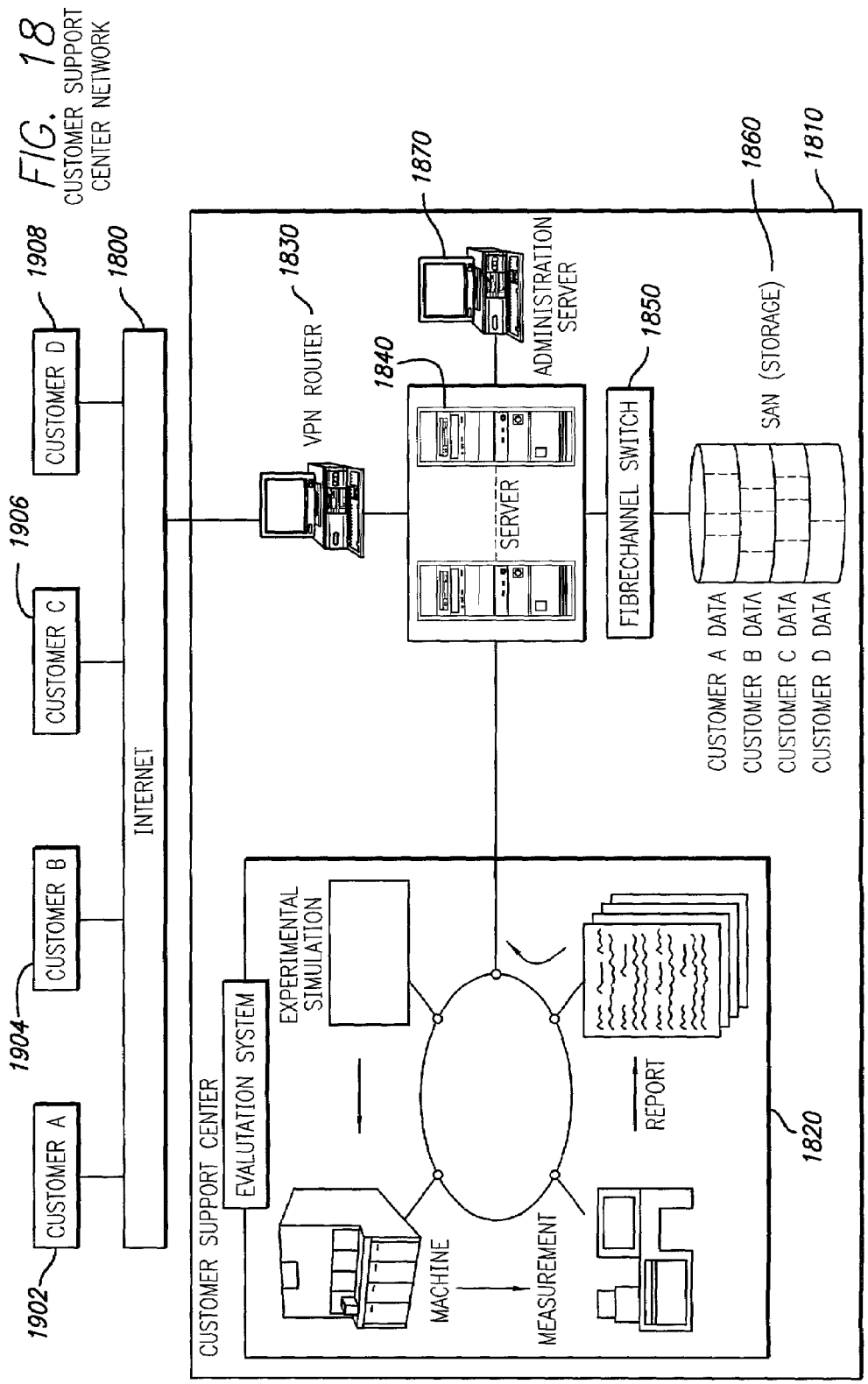
FIG. 18 shows a representative network configuration of the customer support center in a specific embodiment of the present invention.

FIG. 18 shows a representative network configuration of an example customer support center in a specific embodiment of the present invention. VPN router 1830 establishes multiple VPN tunnels, each of which leads to one of a plurality of customer sites (1902, 1904, 1906 and 1908) through the Internet 1800. There are one or more application servers 1840 corresponding to each customer. The application servers provide applications, which are programs used to monitor, maintain and evaluate the semiconductor manufacturing devices installed in the customer premises, for example. In the example of FIG. 18, an evaluating system 1820 is contained in the server. The application servers 1840 are connected to storage devices 1860 via a Fibre Channel switch 1850. The storage devices 1860 contain customers' data, which may be separated on a per-customer basis.

An administration server 1870 is responsible for configuring each system component within the customer support center 1810. The ISMS and SMSs (not shown in FIG. 18) run on the administration server 1870.

Figure 19:
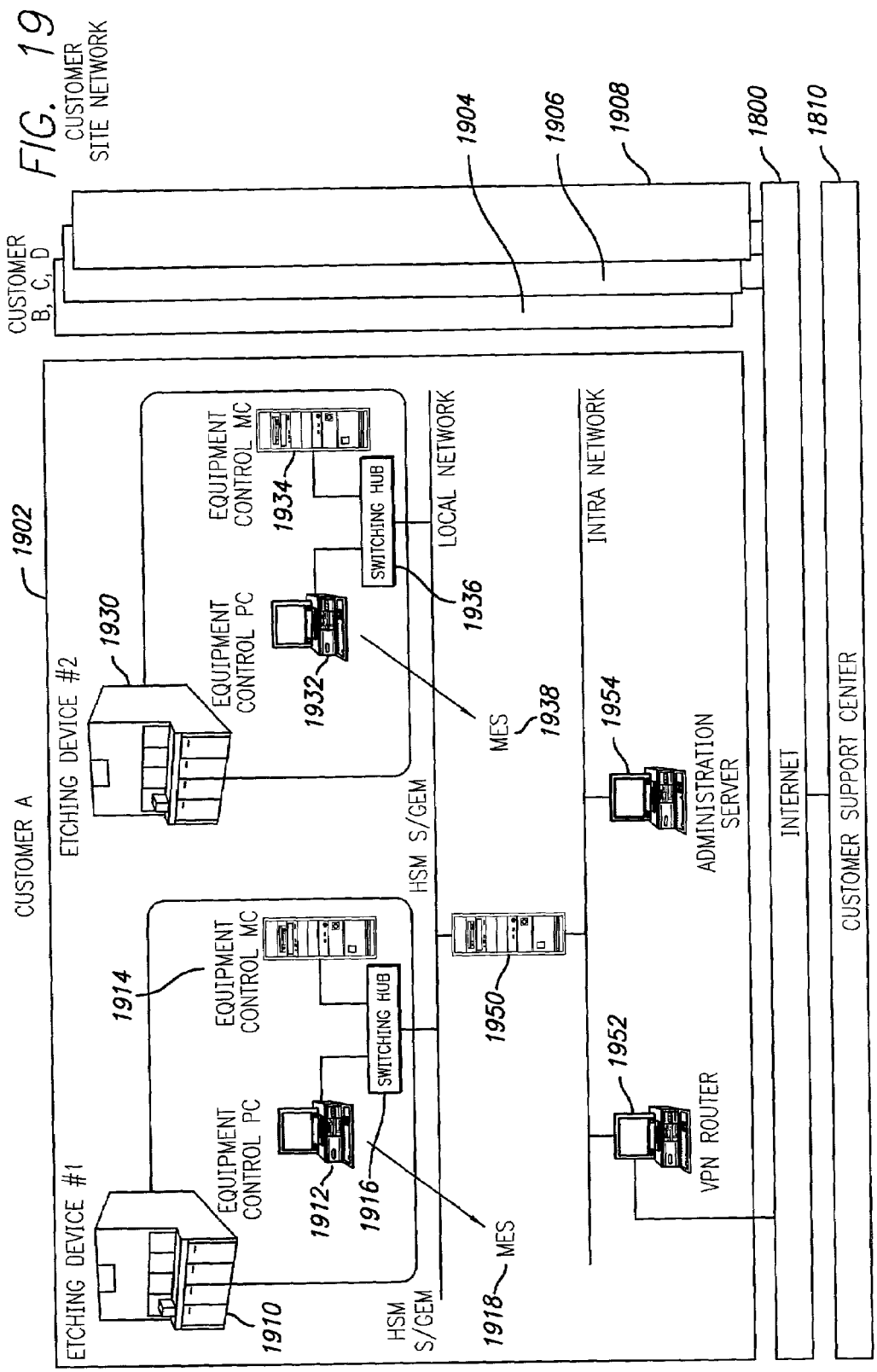
FIG. 19 shows a representative network configuration of one of customer sites 1902 in a specific embodiment of the present invention.

FIG. 19 shows a representative network configuration of one of the customer sites in a specific embodiment of the present invention. A customer site 1902 has one or more semiconductor manufacturing devices installed therein. Of course, other types of devices can be used as well, as semiconductor manufacturing is being used as an illustrative example, and not intended to be limiting. In the example site illustrated in FIG. 19, for example, two etching devices (1910 and 1930) are installed. Each device is attached to an equipment control personal computer (PC) (1912 and 1932) and an equipment control microcomputer (MC) (1914 and 1934). Both PC and MC are connected to the customer's local network via a switching hub (1916 and 1936). Equipment control PC also has a connection to a manufacturing execution system (MES) (1918 and 1938) for communication using, for example, a high-speed SECS message services and generic equipment model (HSMS/GEM).

A server 1950 is responsible for collecting data from PCs and MCs and sending the data to the customer support center 1810. A VPN router 1952 is connected through a VPN tunnel over the Internet 1800 to its peer VPN router in the customer support center 1810. An administration server 1954 is responsible for configuring each of the service components within the customer network. The ISMS and SMSs (not shown in FIG. 19) run on the administration server 1954.

Other customers (customer B, C and D), shown in abbreviated format in FIG. 19, also have network systems (1904, 1906 and 1908) within their own premises. These network systems may be similar, or may have different components, than that of network 1902. However, the customer sites are connected through VPN tunnels to the customer support center 1810.

FIG. 20 shows representative diagnostic information collected in the service in a specific embodiment of the present invention. The server 1950 in the customer network 1902 in FIG. 19 collects I/O status data, log data, records, parameters and recipe data, for example. An I/O status data includes the current status of digital input/output and analog input/output, wafer position data and process execution status. Log data includes PC-MC communication log, GEM communication log, wafer move event log, MC task execution log and lot management data. Records include service sequence measurement data, such as leak rate, MFC flow rate, and so forth, and maintenance warning data, such as consumable parts, number of product wafers, RF time accumulation, and so forth. Parameter data includes systems parameters and user parameters. Recipe data includes etching recipe and ashing recipe, such as gas flow rate, pressure, RF power, step time, and so forth. In some embodiments, other types of data may be collected, additional data may be collected, or some of the data illustrated by FIG. 20 may be omitted.

The collected data is sent to the customer support center 1810 and processed by the evaluation system 1820 and stored in the storage 1860. Because the VPN, server and storage are assigned to each customer by the ISMS, the customer can keep the confidentiality of the information processed and stored in the customer support center.

In this particular embodiment, the operator in the customer support center can also connect to the server 1950 in the customer site 1902 through a VPN connection in order to gather information related to the semiconductor manufacturing devices installed in the customer site. This can be useful when there is a problem on the semiconductor manufacturing device in the customer site, as the operator can investigate the cause of the problem without making a trip to the customer's site. Instead, the operator can log on to the server 1950 and collect the necessary information to recover from the problem.

In specific embodiments, the customer support center may be responsible for monitoring more than one customer site. Accordingly, an operator of the customer support center should have access to pertinent data when something has gone wrong with the semiconductor manufacturing device within one of the customer sites. In case of a breakdown of the device, the operator should be allowed to read some portion of the data stored in the customer storage volume. In a specific embodiment, the customer can explicitly designate what data the operator may access. One way to enable a customer center operator to view only a part of customer data is to provide the storage SMS with detailed access control capabilities. In a specific embodiment, marking each customer storage volume with an additional attribute of "disclosure level" provides this functionality.

FIG. 21 shows a representative disclosure level configuration table in a specific embodiment of the present invention. A configuration table 2100 comprises a matrix that defines who can access which part(s) of one or more storage volumes. While a wide variety of schemes can be used, in a specific embodiment an information disclosure level is assigned to the various portions of one or more volumes. Each information disclosure level can be assigned different access privileges for various customers. In addition, it is possible to define a special access privilege for operators.

In an illustrative example, a first row (2102) of the configuration table 2100 shows the access control configuration for customer A's storage volume, which has been assigned a disclosure level "0". The customer A can both read from and write to the volume (R/W access). On the other hand, the customer B and C cannot access this volume because their access privilege is "No." The operator, however, can read or write this volume because the access privilege for operator is defined as "R/W," which is the same as that of customer A.

In a second row (2104) of the table 2100 defines access privileges for the customer A's storage volume with disclosure level "1." In this case, while the customer A, B and C have the same access privileges as for the disclosure level 0, the operator's access privilege is limited to read only (R/O). As shown in a third row (2106) and a fourth row (2108) of the table 2600, a volume having information disclosure level 2 and level 3 can be read only by the customer A. These volumes would be completely private from the operator. In this way, the customers can assign whichever access control policy meets their needs to their storage using the disclosure level configuration table. Using the mechanism of the information disclosure level, the customer A can maintain confidentiality of part of its manufacturing data while allowing the operator to get information to identify trouble in any of the manufacturing devices.

It should be noted that the example configuration information of table 2600 in FIG. 21 is an abbreviated representation used for illustration purposes and not intended to be limiting. Other customers can also define their own information disclosure level configuration in the same manner as for the customer A. As the configuration is independent from customer to customer, different customers can apply completely different disclosure level policy to their own volumes.

Using information disclosure levels, the customer can allow the operator in the customer support center to read and/or modify a part of the information stored in the storage without revealing confidential information. This is especially useful in specific embodiments wherein the operator checks the information stored in the customer storage in the customer support center to diagnose the manufacturing device in the customer site without connecting to the customer site via VPN.

While the present invention has been described with reference to manufacturing installations in general, and semiconductor manufacturing applications specifically, these example embodiments are merely illustrative of the wide variety of applications of the principles of the present invention. Other embodiments readily achievable by those of ordinary skill in the art will be apparent from the teachings provided herein. For example, in one specific embodiment, network service providers that offer complex value-added services combining more than one service components can deploy their systems according to embodiments of the present invention. In a representative example, storage service providers (SSPs) seeking to expand their service offerings may integrate secure network access into their storage point of presence by using VPN technology. The present invention as described by the example embodiments herein can enable the service provider to configure, maintain and manage services with less operation cost. Logical partitioning features can be particularly useful in instances where more customers can be served with the same number of servers.

The application of principles of the present invention to embodiments useful to semiconductor manufacturing installations illustrates the potential effectiveness of specific embodiments of the present invention in realizing value-added services that combine VPN, servers, and storage.

The preceding has been a description of the preferred embodiments of the present invention. It will be appreciated that deviations and modifications can be made without departing from the scope of the invention, which is defined by the appended claims.

What is claimed is:

1. A system, comprising:
    a connection to a virtual private network;
    a router, connected to said virtual private network, wherein said router maintains at least one virtual router for a client, wherein the router receives packets from the virtual private network, each packet having a VPN ID, wherein the router uses the VPN ID and a dedicated virtual routing table to filter packets to the virtual router associated with the VPN ID, wherein the virtual router adds tag information based on the VPN ID to the packets before transmitting the packets to the virtual LAN switch, thereby enabling virtual separation of packets within the router and enabling IP addresses spaces within a private address range to overlap between different clients;
    at least one server, said server having at least one logical partition, each server having server identification information;
    an administration server;
    a virtual LAN switch, connected to said router, said virtual LAN switch providing selectable forwarding of information from said router to said at least one logical partition of said at least one server, said virtual LAN switch using the tag information and a dedicated server table to forward the packets to an appropriate logical partition of said at least one server;
    at least one volume, said at least one volume accepting of information for storage thereon, said information having a shared portion and a non-shared portion;
    fibre channel (FC) switch, wherein said fibre channel (FC) switch provides selectable interconnection between said at least one logical partition of said at least one server and said at least one volume, wherein the fibre channel (FC) switch uses the server identification information and a storage table to determine an appropriate one of said at least one volume, to confirm rights of the server to access the determined volume, and to forward the packets from the server to the determined one of said at least one volume, and wherein said shared portion of said information is accessible via said administration server.

2. The system of claim 1, further comprising a virtual private network management system that controls operation of said router.

3. The system of claim 2, said virtual private network management system further comprising: a network interface module that receives commands from an integrated service management system, a service order processing module that analyzes and executes the commands, updates a table of virtual private network information, and sends new configuration information to said router through a control module.

4. The system of claim 2, wherein said virtual private network management system stores the virtual routing table, said virtual routing table having a VPN ID that identifies a specific VPN, an Address 1 and an Address 2 that hold IF addresses of two end points of said specific VPN, a Protocol that specifies a VPN protocol that is used on said specific VPN, an Internet flag that indicates whether access to public Internet is permitted, and a VLAN ID) that is assigned to packets received over said specific VPN.

5. The system of claim 1, further comprising a server management system that controls operation of said virtual LAN switch.

6. The system of claim 1, further comprising a storage management system that controls operation of said FC switch.

7. The system of claim 1, further comprising an integrated service management system, said integrated service management system further comprising: a network interface module that receives requests to change configuration, a service order processing module that analyzes and executes requests to change configuration received by said network interface module, updates related table cache in a service management database, and sends new configuration information using said network interface module.

8. The system of claim 7, further comprising an operator console application that sends a request command to change service configuration to said integrated service management system.

9. The system of claim 7, further comprising a customer portal application that sends a request command to change service configuration to said integrated service management system.

10. The system of claim 7, wherein said integrated service management system further comprises a service configuration table, said service configuration table having destination information.

11. The system of claim 7, wherein said integrated service management system stores the server table, said server table having a server identification, an address, a physical server identifier, a virtual LAN identification, a logical partition (LPAR) identification, a host bus adaptor (HBA) identification, an application identification, an operating system identifier, and a CPU information.

12. The system of claim 7, wherein said integrated service management system stores the storage table, said storage table having a volume identifier, a port identifier, an allowed host bus adapter(s) (HBAs) identifier, a capacity identifier, and an access information.

13. The system of claim 7, wherein said integrated service management system further comprises a service mapping table, said service mapping table having a customer identifier, a virtual private network identifier, a server identifier, and a volume identifier.

14. The system of claim 7, wherein said integrated service management system further comprising a service status table, said service status table having a customer identifier, a virtual private network status, a server status, and a volume status.

15. An apparatus, comprising:

a connection to a virtual private network;

a router, connected to said virtual private network, wherein said router maintains at least one virtual router for a client wherein the router receives packets from the virtual private network, each packet having a VPN ID, wherein the router uses the VPN ID and a dedicated virtual routing table to filter packets to the virtual router associated with the VPN ID, wherein the virtual router adds tag information based on the VPN ID to the packets before transmitting the packets to the virtual LAN switch, thereby enabling virtual separation of packets within the router and enabling 12 addresses spaces within a private address range to overlap between different clients;

at least one server, said server having at least one logical partition;

an administration server, each server having server identification information;

a virtual LAN switch, connected to said router, said virtual LAN switch providing selectable forwarding of information from said router to said at least one logical partition of said at least one server, said virtual LAN switch using the tag information and a dedicated server table to forward the packets to an appropriate logical partition of said at least one server;

at least one volume, said at least one volume accepting of information for storage thereon, said information having a shared portion and a non-shared portion;

fibre channel (FC) switch, wherein said fibre channel FC) switch provides selectable interconnection between said at least one logical partition of said at least one server and said at least one volume, wherein the fibre channel (FC) switch uses the server identification information and a storage table to determine an appropriate one of said at least one volume, to confirm rights of the server to access the determined volume, and to forward the packets from the server to the determined one of said at least one volume, and wherein said shared portion of said information is accessible via said administration server.

* * * * *